May 21, 1940.  W. A. BROWN  2,201,153
LIGHTING AND AIR IMPELLING DEVICE
Filed June 13, 1939  5 Sheets-Sheet 1
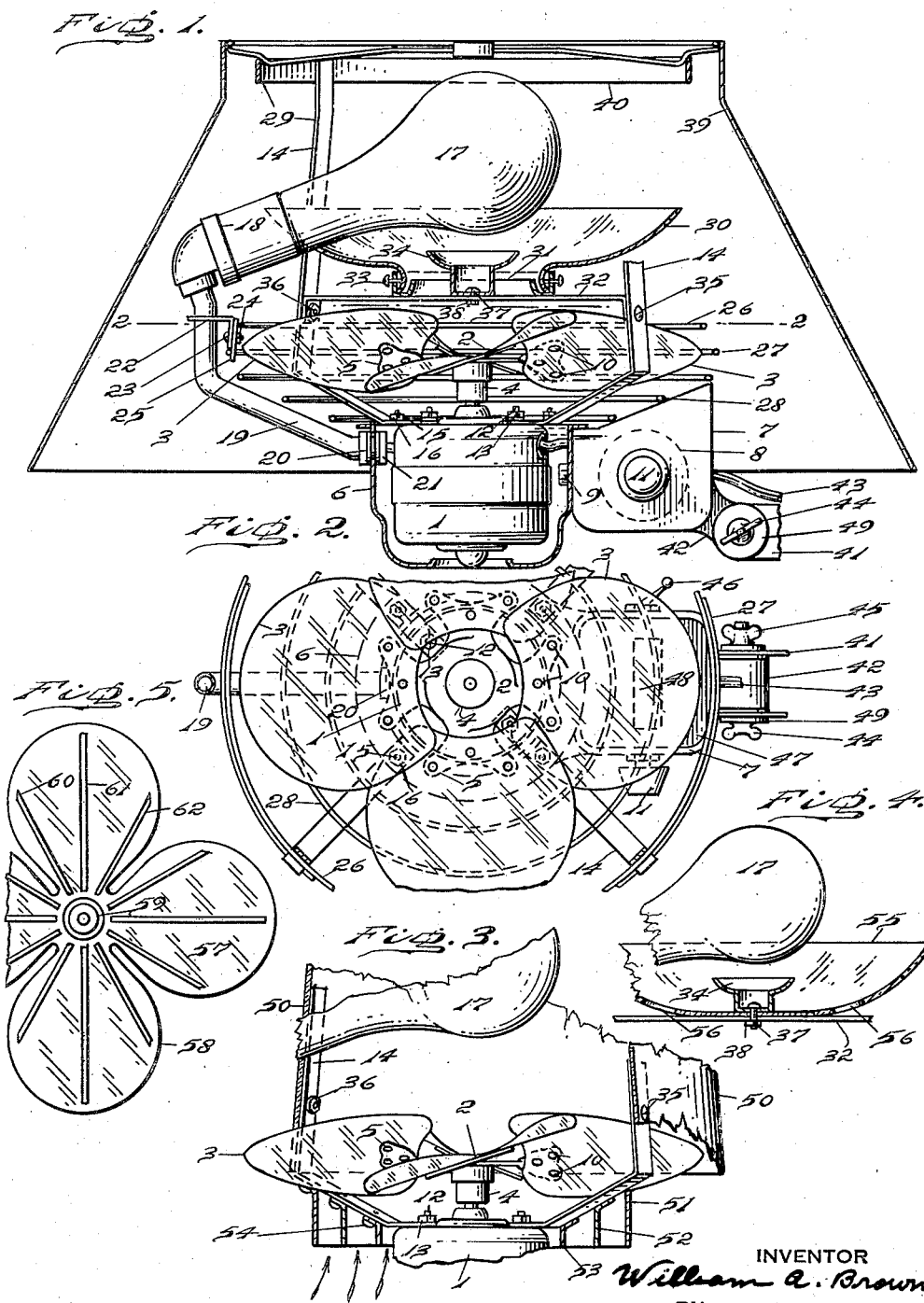
INVENTOR
William A. Brown
BY
Herbert S. Fairbanks
ATTORNEY May 21, 1940. W. A. BROWN 2,201,153
LIGHTING AND AIR IMPELLING DEVICE
Filed June 13, 1939 5 Sheets-Sheet 2
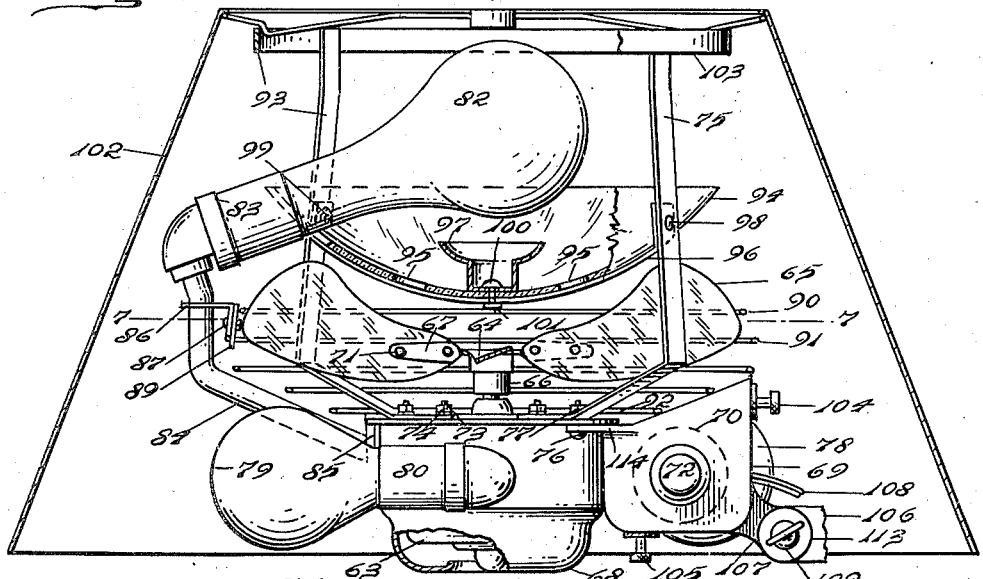
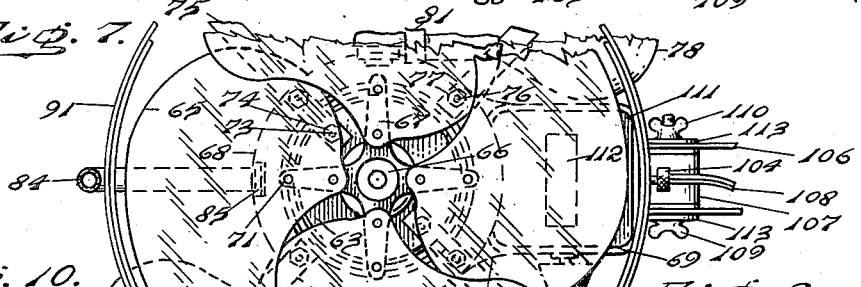
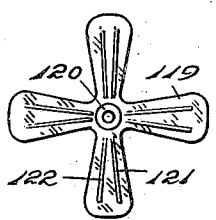
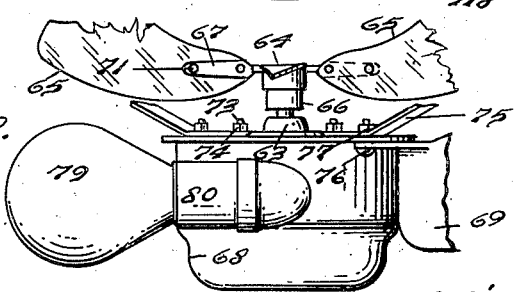
INVENTOR
William A. Brown
BY
Herbert P. Fairbanks
ATTORNEY

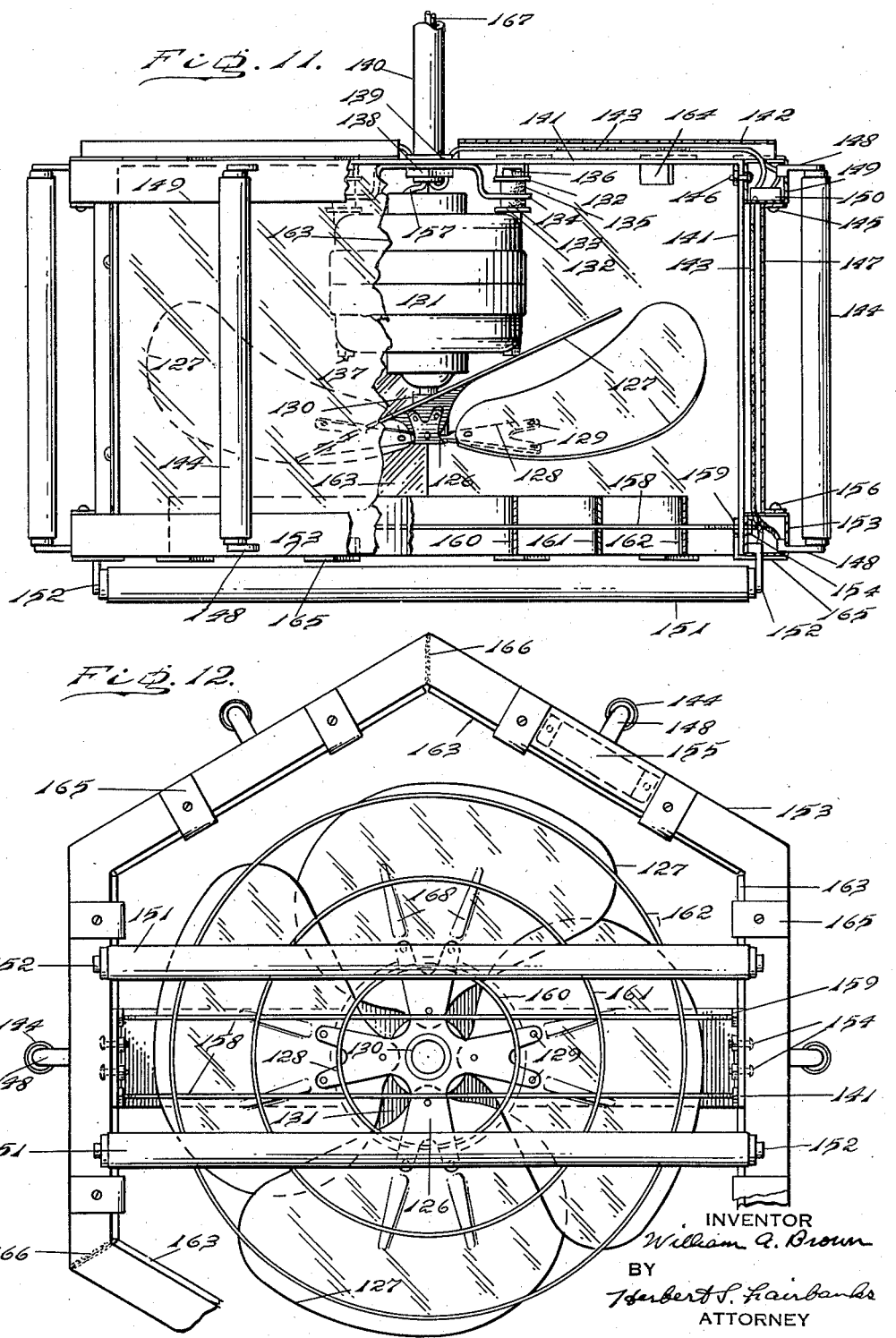

May 21, 1940.  W. A. BROWN  2,201,153
LIGHTING AND AIR IMPELLING DEVICE
Filed June 13, 1939   5 Sheets-Sheet 4
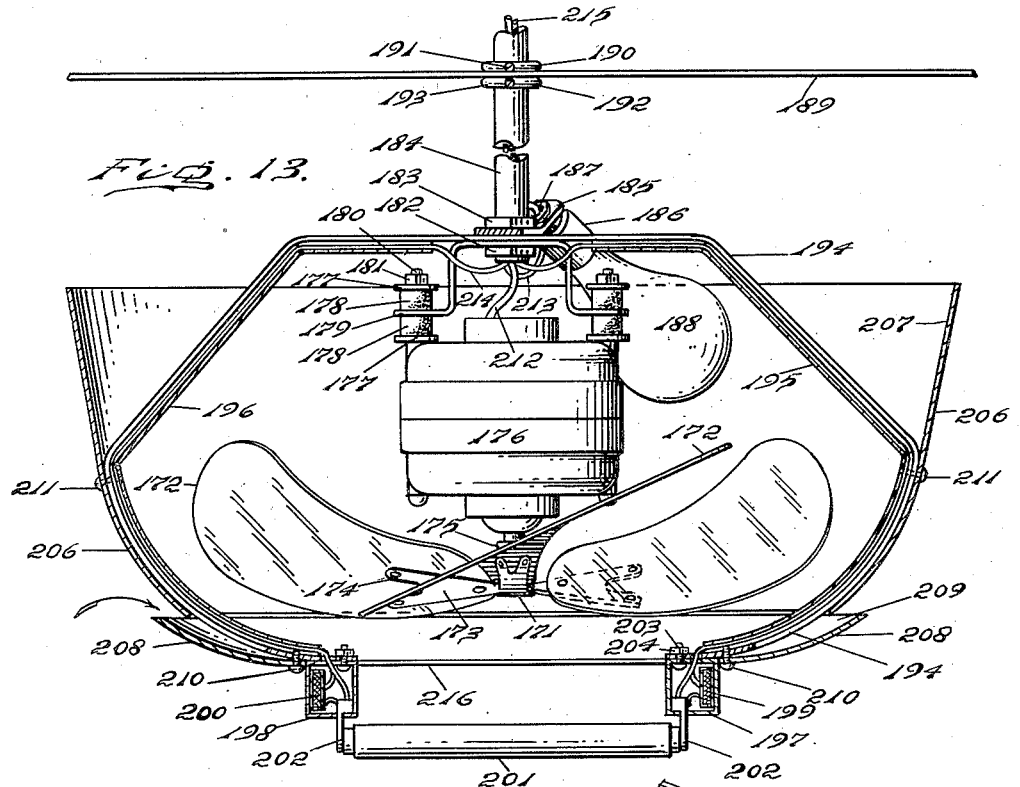
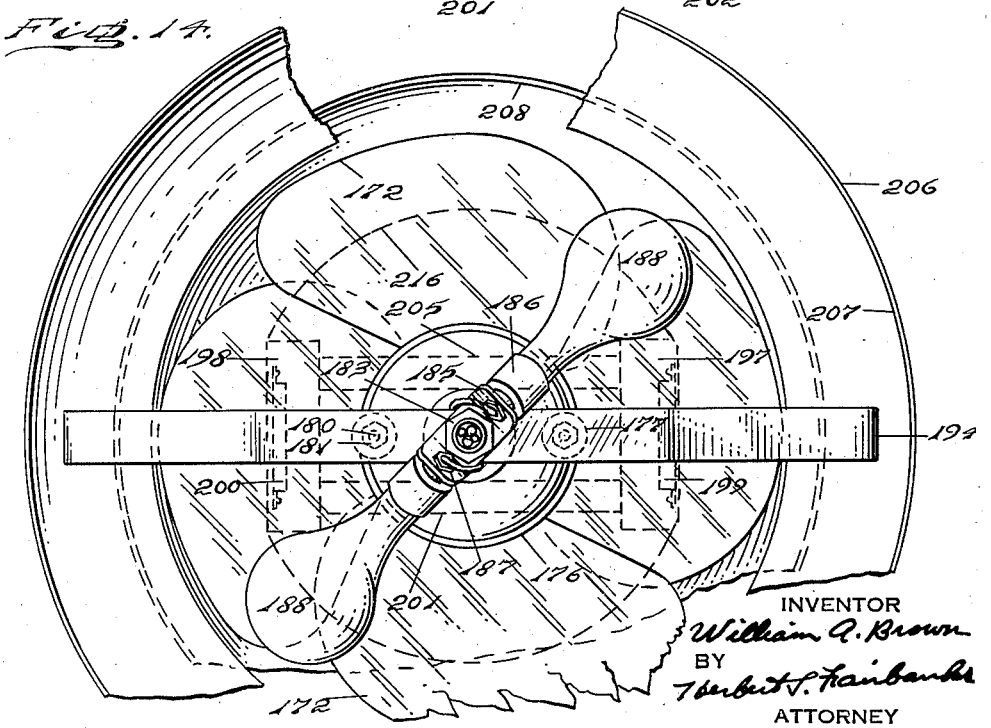
INVENTOR
William A. Brown
BY
Herbert J. Fairbanks
ATTORNEY

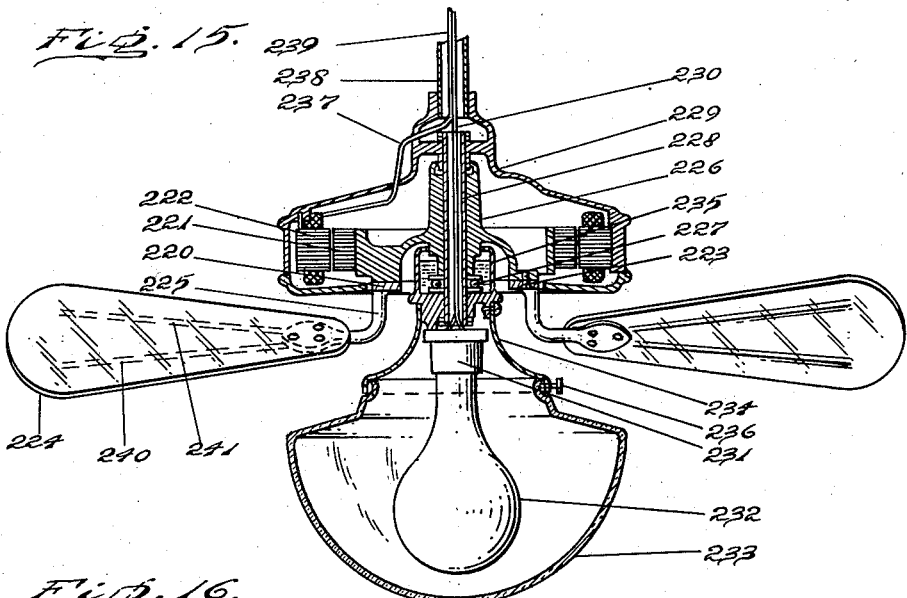
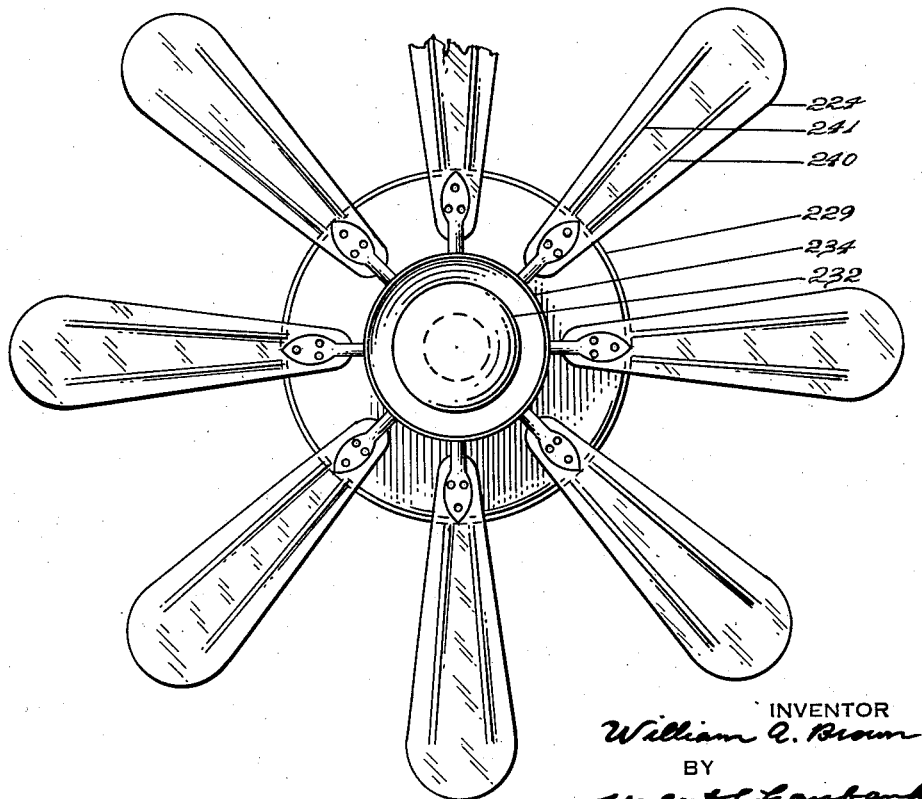

Patented May 21, 1940

2,201,153

UNITED STATES PATENT OFFICE 2,201,153

LIGHTING AND AIR IMPELLING DEVICE

William A. Brown, Philadelphia, Pa.

Application June 13, 1939, Serial No. 278,823

20 Claims. (Cl. 230—249.5)

In the commercial development of a device combining lighting means and air impelling means, wherein the air impelling means is in the path of light rays issuing from the lighting means, the problem of flicker at low impeller speeds is serious and it has not been, heretofore, solved.

In my prior patents, 2,087,239 and 2,087,240, I have disclosed novel means for reducing flicker, such as the use of a source of light on opposite sides of the air impelling means, but since an opaque impeller was used satisfactory results could only be obtained under certain restricted operating conditions, especially at low impeller speeds.

The other and equally serious problem of loss of illumination, where an opaque air impeller is in the path of light rays issuing from the source of light and said impeller is at a standstill or revolving slowly, can only be solved satisfactorily by the use of an air impeller having light transmitting air impelling blades.

It is therefore the primary objects of this invention to overcome the foregoing defects in prior devices of this character, and to devise a construction wherein an air impeller having light transmitting air impelling blades is in the path of light rays issuing from a source of light, whereby the desired volume of illumination is obtained and flicker is eliminated.

The character of the supporting means employed on the devices disclosed herein, may vary widely in practice and may be in the form of a floor, table, wall or ceiling support.

With the above and other objects in view, as will hereinafter clearly appear, my invention comprehends a novel lighting and air impelling device.

Other novel features of construction and advantage will hereinafter more clearly appear in the detailed description and the appended claims.

For the purpose of illustrating the invention, I have shown in the accompanying drawings typical embodiments of it, which in practice, will give satisfactory and reliable results. It is, however, to be understood that the various instrumentalities of which my invention consists can be variously arranged and organized, and my invention is not limited to the exact arrangement and organization of these instrumentalities as herein set forth.

Figure 1 is a sectional elevation of a lighting and air impelling device, embodying my invention.

Figure 2 is a section on line 2—2 of Figure 1.

Figure 3 is a modified form of Figure 1, in side elevation and partly broken away.

Figure 4 is another modified form of Figure 1, in sectional elevation and partly broken away.

Figure 5 is a top plan view of an air impeller having reinforcing means.

Figure 6 is a sectional elevation of another embodiment of my invention.

Figure 7 is a section on line 7—7 of Figure 6.

Figure 8 is a side elevation, partly broken away, of a modified form of Figure 6.

Figure 9 is a sectional elevation, partly broken away, of another modified form of Figure 6.

Figure 10 is a top plan view of another type of air impeller having reinforcing means.

Figure 11 is a side elevation, partly in section, of another embodiment of my invention.

Figure 12 is a bottom plan view of Figure 11.

Figure 13 is a sectional elevation of another embodiment of my invention.

Figure 14 is a top plan view, partly broken away, of Figure 13.

Figure 15 is a sectional elevation of another embodiment of my invention.

Figure 16 is a bottom plan view of Figure 15.

Similar numerals indicate corresponding parts.

Referring to the drawings:

Referring to Figures 1 to 4 inclusive, 1 designates a conventional motor which drives an air impeller 2 having a desired number of light transmitting air impelling blades 3. 4 is an impeller hub fitted to the drive shaft of the motor 1 and 5 is an impeller spider to which the air impelling blades 3 are attached by any suitable means, such as the rivets 10. 6 is a casing surrounding the motor 1, which is preferably open at its top and bottom to dissipate motor heat. In many instances, this casing 6 may be dispensed with. 7 is a junction box, which is also vented in any desired manner to dissipate the heat generated by a variable motor speed control rheostat 8, through which the motor 1 operates and which has an insulated knob 11. While the casing 6 and the junction box 7 are shown as separate parts rigidly held together by the screw 9, it is to be understood that they may be combined in one piece if desired. The motor studs 12 and the nuts 13 act to hold the motor 1 in position on the supports 14 of the guard 29, and the screws 15 with the nuts 16 act to hold the casing 6 in position on said supports 14, as well as contributing to the support of the junction box 7 in its assembled position on said casing 6.

A light bulb 17 is positioned in a socket 18 which is attached to a tubing 19. The nuts 20 and 21 hold the lower threaded end of the tubing 19 to the casing 6, while the upper section is supported by a bent metal strip 22 through which it passes. The screw 23 and the nut 24 hold the metal strip 22 to another and similar metal strip 25 that is welded to metal rings 26 and 27 of a guard 29, thereby preventing any movement of the tubing 19 after assembly. It is to be understood that the conventional light bulb 17 may be replaced by any suitable lighting means, and the conventional socket 18 may be dispensed with for any suitable means for receiving said lighting means.

The light transmitting member 30, adjacent to the light bulb 17, is preferably open ended to prevent an accumulation of heat around the bulb 17, and it may or may not have reflecting-diffusing qualities. A flanged double wall ring 31 that supports the light transmitting member 30 is welded to a cross member 32 and has adjustable screws 33 which may be moved in or out in seating or removing the member 30 into or out of a ring 31. A reflector 34, which is preferably opaque and made of metal, acts to prevent the radiant heat of the bulb 17 from reaching the motor 1 and more particularly the adjacent portions of the air impeller 2, when high wattage light bulbs 17 or their equivalent are used. In many instances, however, this reflector of insulator 34 may be dispensed with. The cross member 32 is removably but rigidly mounted on the supports 14 by means of the screws 35 and the nuts 36, and seats on the wire ring 26, which is welded to the inside surface of the supports 14. The reflector 34 is attached to the cross member 32 by the screw 37 and a nut 38.

A guard 29, comprising the supports 14 to which a series of spaced wire rings such as 26, 27 and 28, are permanently attached, acts to prevent damage to the propeller 2 and more particularly to the light transmitting blades 3, as well as supporting a shade 39 or its equivalent. In practice, this guard will vary in shape and construction, and, in certain instances, may even be made as a light transmitting segmental or integral cylinder extending from the bottom of the light transmitting air impelling means 3 to the top of the ring 40, as disclosed in Figure 3. In some cases the spaced wire rings, such as 26, 27 and 28, of Figure 1 would be replaced by the transparent or translucent rings of Figure 3. It is to be understood that the shade 39 may be made of any suitable material and in any desired shape or form, and, in certain instances in practice, will be dispensed with.

As I prefer to have the entire assembly of motor, junction box, light transmitting air impelling means, light bulb, light transmitting member, and their adjuncts, adjustable from a position where the air impeller 2 is horizontal to one where it is perpendicular, I have shown a swivel mounting having a yoke 41, within which is a fitted ear 42 to permit of a rigid adjustment of the entire assembly in any desired position by means of a conventional thumbscrew 44, wing nut 45 and washer 49 arrangement, as fully shown in Figure 2. The yoke 41 is a part of a standard having a floor or table base, which are not shown, it being understood, however, that ways and means of mounting or supporting the assembled structure will vary with different applications.

The manner of properly connecting the wires from the socket 18 and the motor 1 to the main lead wires 43 and to the rheostat 8 that controls the speed of the motor and to the switch 46 that controls the light bulb socket 17, is well known to those skilled in the art. A detailed explanation of the procedure to be followed, is therefore unnecessary.

Figure 2 shows more clearly the overlapping feature of the light transmitting air impelling blades 3, which is preferred, as it has been proved that such a construction does contribute to the elimination of noise at high and low impeller speeds. As will be seen, the light transmitting air impelling blades 3 are rigidly held in position on the impeller spider 5 by means of the rivets 10, or their equivalent. I prefer to use a light transmitting material in manufacturing the impeller hub 4 and the spider 5. It is to be understood, however, that in many cases in practice these parts will be made of metal or any other suitable material having either opaque or light transmitting characteristics, since their position with respect to the lighting means 17 and the motor 1 is such that they will have very little or no bearing on the elimination of flicker while revolving, or a reduction of illumination while stationary.

Figure 2 also shows the relation of the thumbscrew 44, the washer 49 and the wing nut 45, to the yoke 41, and to the ear 42 of the junction box 7. The location of the switch 46 that controls the lighting means 17 as well as the junction box cover 47, which has a slot 48, are more clearly seen in this view. In many instances I prefer to duplicate the slot 48 in the bottom of the junction box 7, to accelerate the escape of the heat thrown off by the rheostat 8.

Figure 3 is the same as Figure 1 in all respects except that I have dispensed with the light transmitting member 30, the cross member 32, and the reflector 34. In certain cases in practice I prefer to replace the spaced wire rings, such as 26 and 27 of Figure 1, that are attached to the upright portions of the supports 14, with a light transmitting member 50 to surround the light transmitting air impelling blades 3 and extending upward to enclose the lighting means 17. In certain instances, I also prefer to replace the wire rings such as 28 of Figure 1, that are attached to the bottom portions of the supports 14, with light transmitting rings 51, 52 and 53, also attached to the supports 14 by any suitable method, such as the screws 54. As will be noted, by proper spacing of these rings, when made the correct length, it will be possible to divide the air flow created by the air impelling blades 3 to obtain a more efficient result.

The use of the rings 51, 52 and 53, properly designed for the purpose and having correct translucent qualities, will also provide desirable diffused illumination should I prefer to make the light transmitting air impelling blades 3 of a transparent material, to permit full passage through the air impelling blades 3 of the light rays from the lighting means 17. Should I prefer to make the air impelling blades 3 of translucent material, colored a cobalt blue for example, to obtain efficient daylight lighting directly through the blades, I would then prefer to make the rings 51, 52 and 53 of a transparent material.

In other words the light transmitting air impelling blades 3 and the light transmitting rings 51, 52 and 53 may be co-operatively designed to provide efficient diffused or glareless lighting of the proper intensity, with or without the use of the member 30 adjacent to the lighting means 17 as seen in Figure 1, and without in any way affecting the usefulness of said rings in securing a more even distribution of the air flow created by the light transmitting air impelling blades 3.

The further use of an integral or segmental guard 50 around the air impelling blades 3 and the bulb 17 in place of the spaced rings seen in Figure 1, and having light transmitting qualities will permit me to dispense with the shade 39, seen in Figure 1, if desired, and still obtain diffused glareless illumination of a high quality by simply making said guard of a bluish translucent material. In most instances in practice, however, I should prefer to make said guard 50 either transparent or of a whitish tint and surround it with a suitable shade 39.

It is to be understood that the guard 50 and the rings 51, 52 and 53 may be supported in any desirable manner other than by the uprights 14. It is to be understood also that the guard 50 and the rings 51, 52 and 53 of Figure 3, either together or singly, may be dispensed with for the wire ring construction seen in Figure 1 or its equivalent for protecting or enclosing the air impelling blades 3.

Figure 4 is the same as Figure 1 in all respects except that I have dispensed with the ring 31 and attach the light transmitting member 55 directly to the cross member 32 by means of the same screw 37 and nut 38 which hold the reflector or insulator 34 in rigid assembly on the cross member 32. In this construction, it will be noted that the light transmitting member 55, which may or may not have reflecting-diffusing qualities, is closed at the bottom, and it may or may not have a series of openings 56, preferably round, to provide a continuous upward passage of air around the lighting means 17. It will also be evident that in many instances in practice the light transmitting member 55 or its equivalent may be dispensed with and only the reflector or insulator 34 used.

In Figure 5 I disclose a conventional type of impeller 57 without overlapping air impelling means 58. In this instance, the light transmitting air impelling means 58 and the hub 59 could be easily molded integral from any suitable plastic material having the desired light transmitting characteristics, in either a transparent or transluscent form. The use of reinforcing ribs, such as 60, 61 and 62, may be advisable in some instances where strength without weight is necessary and an all over thickening of the blades would be unsuitable. It is of course evident that reinforcing ribs may also be incorporated in the detachable type of light transmitting air impelling blades 3 shown in Figures 1, 2 and 3, if desired. It will also be evident that said ribs, under certain conditions, may be opaque and of metal, without departing from the scope of this invention. Since most air impellers are statically balanced and many are dynamically balanced as well to insure quiet efficient operation, it is essential that the light transmitting air impelling blades 3 and 58 of Figures 1 and 5 be constructed to resist permanent deformation under hard usage and to maintain surface conformation indefinitely and while the use of reinforcing means such as the ribs 60, 61 and 62 is not essential, in certain instances reinforcing means will be necessary.

Referring to Figures 6 to 9 inclusive, 63 is a conventional motor, which may or may not be concealed in the casing 68, and which drives the light transmitting air impelling means 65 of the impeller 64 which have the same characteristics already described for the air impelling blades 3 of Figure 1, notwithstanding a difference in shape and position. 66 is the impeller hub, and 67 is the spider to which the air impelling means 65 are attached by any suitable means, such as the rivets 71. The junction box 69 is the preferred means of concealing a rheostat 70 for controlling the speed of the motor 63 through the use of an insulated knob 72, which is attached to said rheostat. In many instances in practice, the rheostat 70, or its equivalent, will be dispensed with, or it may be mounted at a point distant from the motor 63. The motor studs 73 and the nuts 74 for rigidly attaching the motor 63 in position on the supports 75 are the same as described for Figure 1, as are the screws 76 and the nuts 77 that hold the casing 68 in assembly on the supports 75, as well as contributing to the support of the junction box 69.

In the embodiment of my invention seen in Figures 6 and 7, I employ the lighting bulbs 78 and 79 or their equivalent, which are mounted on the opposite side of the light transmitting air impelling means 65 to that of the light bulb 82 or its equivalent. In this construction, light rays from either lighting means may pass through the light transmitting air impelling means 65 as desired, or both sources of light may be turned on simultaneously to increase the intensity of the illumination in either direction or both directions.

As will be noted, the light bulbs 78 and 79, are mounted in the standard sockets 80 and 81, located below the light transmitting air impelling means 65 and the light bulb 82 is mounted in a similar socket 83 above the air impelling means 65. The tubing 84, the nut 85 that positions said tubing on the motor casing 68, the bent metal strip 86 that rigidly holds it in assembly on the wire guard 93 by means of the metal strip 89 and the screw 87 with its nut 88, are the same as shown and described for Figure 1. The top wire ring 90, the middle ring 91 and the bottom ring 92, which are preferably welded to the four supports 75 in helping form the wire guard 93 which surrounds and protects the light transmitting air impelling means 65, are also the same as described for Figure 1.

The member 94, which is preferably light transmitting, but which may be opaque in certain instances, and which may or may not have reflecting-diffusing qualities, is also preferably formed with a series of small holes 95 to help prevent an accumulation of heat around the lighting means 82. If the quick dissipation of this heat is unnecessary, these holes 95 can be dispensed with. The cross member 96 that supports the member 94 is permanently held in position on the uprights 75 by means of the screws 98 and the nuts 99. The reflector or insulator 97, which is preferably of metal and similar to 34 of Figure 1, contributes with the screw 100 and the nut 101 in holding the member 94 in its assembled position on the cross member 96, but may be dispensed with if desired. It will also be evident in this embodiment of my invention that the member 94 may be dispensed with and only the reflector or insulator 97 used.

The shade 102, which is seated on the top ring 103 of the wire guard 93, is preferably instantly removable should the assembly be moved from the horizontal position shown to a vertical or semi-vertical position around the pivotal construction comprising the yoke 106, the boss or ear 107, the washer 113 and the thumbscrew 109. As already explained in referring to the rheostat 70, the switch 104 that controls the light bulbs 78 and 79 and the switch 105 that controls the bulb 82, may be replaced by other suitable controls. It will also be understood that these switches 104 and 105 or their equivalent may be located at a point distant from the assembly. It is to be further understood that the junction box 69 or its equivalent may be located at a point away from the assembly, and in some cases dispensed with entirely. The main lead wire 108 is the same as described for Figure 1.

Figure 7 shows more clearly the shape and position of the light transmitting air impelling means 65, as well as the light bulbs 78 and 79. The position of the supports 75 in relation to the motor casing 68, and the screws 76 with their nuts 77 that hold said casing 68 in rigid assembly on said supports 75 are also clearly shown. As will be seen, the screws 76 adjacent to the junction box 69 pass through the ears 114 and act to maintain said junction box in permanent assembly on the motor casing 68 and the main supports 75. The thumbscrew 109, wing nut 110, washer 113, yoke 106, boss 107, forming a pivotal mounting and supporting construction for the assembled unit, are the same as described for Figure 1. It is to be understood however that any suitable mounting or support may be employed. The junction box cover 111 has the vent 112, and there is a similar vent in the bottom of the junction box, which cannot be seen, to permit rapid dissipation of any heat generated by the rheostat 70, as already described for Figure 1.

Figure 8 is another embodiment of my invention wherein I dispense with the lighting means 82 or its equivalent as well as the member 94 of Figures 6 and 7, and their adjuncts located above the light transmitting air impelling means 65. In all other respects, this embodiment is a duplication of the embodiment shown in Figures 6 and 7.

Figure 9 is another embodiment of my invention wherein I replace the member 94 of Figure 6 with an open ended member 115 such as is shown in Figure 1. The flanged double wall ring 117 and the adjustable screws 118 are the same as described for Figure 1. The reflector or insulator 116, which is the same as already described for Figures 1 and 6 and which is preferably made of metal, and the ring 117 are welded to the cross member 123. In all other respects this embodiment is a duplication of that shown in Figures 6 and 7. As already described for Figure 6, either the member 115 or the reflector 116 may be dispensed with, if desired.

Figure 10 shows an integral air impeller wherein the light transmitting air impelling means 119 and the hub 120 are molded as a unit, with or without the reinforcing ribs 121 and 122. In this embodiment, it is to be understood that the hub 120 may be of metal in many instances, and the reinforcing ribs, which have already been described for Figure 5, may include special metal wire should extra resistance to hard usage be required. It will be understood that small diameter wire of great strength and having good reflecting qualities can be advantageously used to reinforce the light transmitting air impelling means without materially affecting the elimination of flicker or reducing illumination because of its opaqueness.

It is to be understood that, while I have shown certain specific types of impellers and forms of air impelling means in Figures 1 to 10, I am not to be limited to any particular type of air impeller or form of air impelling means provided said means has light transmitting qualities. For example, the air impelling blades 3 of Figures 1 to 4 and 65 of Figures 6 to 9 inclusive, are shown as a plurality of light transmitting blades, which could however be constructed as a single element, if desired, to create the proper flow of air.

Referring to Figures 11 and 12, 126 is an air impeller having light transmitting air impelling means 127, detachably mounted on the spider 128 by any suitable means such as the rivets 129, said spider being a part of the hub 130 which is attached to the motor 131. In many instances in practice, I prefer to have the motor 131 reversible to provide air circulation in either an upward or downward direction, as desired, without having to employ adjustable air impelling means. To reduce vibration to a minimum, it is advisable to employ a cushioned support for the motor 131, comprising the metal washers 132, the rubber doughnuts 133 and 135, the cross member 134 and the nuts 136 which are attached to the motor assembly studs 137. The main supporting nut 138 and the secondary co-operating nut 139 are screwed on to the threaded end of the tube 140 and act to hold the entire assembly in rigid position on said tube 140, which leads to any desired construction suitable for a ceiling, wall, table or floor support.

The main assembly cross member 141, which is preferably U shaped and drilled and threaded to provide a firm fit on the tube 140, has the flanged members 142 and 147 welded to it to receive and conceal the wires 143 of the vertically and horizontally disposed quick detachable standard fluorescent lighting lamps 144 and 151. As will be seen, the top and bottom hollow members 149 and 153 are held in rigid assembly on the main supporting member 141 by means of the top screws 145 and 146 and the bottom screws 154 and 156. The conventional socket 148 for the vertically disposed lamps 144 are properly fitted to the top and bottom hollow members 149 and 153, and similar sockets 152 for the horizontally disposed lamps 151 are fitted to opposite sides of the bottom hollow member 153. The standard auxiliaries 150 required for each fluorescent lamp 146 to permit satisfactory operation of said lamps on ordinary electrical wiring and currents are concealed and mounted in the top hollow member 149, and similar auxiliaries 155 for the horizontally disposed lamps 151 are concealed and mounted in the bottom hollow member 153, as will be more clearly understood by referring to Figure 12.

The parallel threaded round bars 158 act to maintain the spaced rings 160, 161 and 162 in proper assembly. The adjustable nuts 159 serve to hold said bars 158 in rigid assembly on the main supporting member 141, and also permit of easy removal of said bars 158 and the rings 160, 161 and 162. The principal advantages obtained by the use of the rings 160, 161 and 162 have already been described for Figure 3. In a ceiling device, however, there is the additional advantage of being able to conceal the motor 131 and its adjuncts to a considerable extent by the proper design and location of these rings which are preferably light transmitting but which may be opaque if desired.

The main lead wires 167, comprising the wires 143 from the lighting means and the wires 157 from the motor, are connected to suitable switches and controls, preferably located away from the assembled unit, and since the method of properly connecting these wires to obtain the desired result is well known to those skilled in the art, it is deemed unnecessary to give a detailed explanation of the procedure to be followed.

In order to materially increase the pulling or suction action of the device, I have enclosed the motor 131 and the light transmitting blades 127 and their adjuncts within the light transmitting panels 163. These panels, when assembled, as will be more clearly understood from Figure 12, to form an open ended closure, also act to conceal the motor 131 and the blades 127 to achieve a very attractive assembly without affecting in any way the illuminating or air flow efficiency of the device. It will be noted, however, that the panels 163 are easily removed by loosening the detachable bottom supports 165, should it be desired to operate the motor 131 and the blades 127 without said panels 163. The top panel supports 164 are similar to those at the bottom but are permanently attached to the top hollow member 149, by any suitable means.

Figure 12, clearly shows the preferred method of assembling the three sections of the top and bottom hollow members 149 and 153 into a hexagonal shaped unit by welding, soldering or otherwise joining the sections together at the points 166. The position of the blades 127 with respect to the bottom horizontally disposed fluorescent lamps 151 is also clearly shown in this figure as well as the location of the threaded round bars 158 with respect to the spaced light transmitting rings 160, 161 and 162. The reinforcing ribs 168 of the light transmitting blades 127 correspond to similar ribs already described for Figures 5 and 10, and may or may not be used, as desired.

In many instances in practice, either the vertically disposed lamps 144 or the horizontally disposed lamps 151, or their equivalent, may be dispensed with, if desired.

Referring to Figures 13 and 14, 171 is an air impeller having detachable light transmitting air impelling means 172, which are held in assembly on the spider 173 by the rivets 174 or their equivalent. It is to be understood, however, that the air impelling means 172, the spider 173 and the hub 175 may be formed integral as a single unit of structure, as already described for Figures 5 and 10. The motor 176 which drives the impeller 171 is preferably of the reversible type, as already described for Figures 11 and 12. The cushioned motor support comprising the metal washers 177, the rubber doughnuts 178, the cross member 179, the motor studs 180, the stud nuts 181, the main supporting nut 182, the secondary supporting nut 183 and the tube 184 are similar to those shown in Figures 11 and 12.

The bracket 185, on which the lamp sockets 186 are assembled by means of the nuts 187, may or may not have a threaded opening to fit the tube 184. The lighting bulbs 188 or their equivalent are preferably mounted away from the motor 176 to minimize heat absorption. The member 189 which is adjustably positioned on the tube 184 by means of the rings 190 and 192, which are slidable on the tube 184 and held in rigid assembly by the screws 191 and 193, may have two co-operative but distinct functions. It can be made to have high light reflecting qualities as well as acting as an air deflector, and it can be dispensed with entirely, if desired. As an air deflector the member 189, when positioned in proximity to the motor, would serve to prevent the air driven upward by the air impeller 171 from mixing with ceiling air, which has certain advantages during hot weather. In cold weather, when maximum illumination as well as thorough mixing of heated ceiling air with cooler floor air to prevent stratification are desirable, said member 189 could easily be moved to a position, on the tube 184, in proximity to the ceiling. Should subdued indirect lighting be required, said member 189 could be made of a cobalt blue tinted material without affecting its hot weather air deflecting features. Said member 189 would be circular in shape in most instances but it could be of any shape suitable for obtaining the best results.

The main supporting cross member 194 has the wire concealing flanged members 195 and 196 attached to it by any suitable means. The hollow members 197 and 198 in which are mounted the auxiliaries 199 and 200 for operating the fluorescent lamps 201 and 205, more clearly seen in Figure 14, are rigidly attached to the cross member 194 by means of the screws 203 and the nuts 204. The sockets 202, in which the tubes 201 and 205 are quick detachably mounted, are also fitted to the hollow members 197 and 198 as required.

The open ended member 206, which is preferably of metal having a high reflecting surface 207, but which may be made of a light transmitting material, is detachably mounted to the cross member 194 with the screws 211. The secondary co-operating member 208, which, with the main member 206, serve to enclose and conceal the motor 176 and the impeller 171 with their adjuncts, is also preferably of metal having a high reflecting inner surface, but may also be made of a light transmitting material. As will be noted, the secondary member 208 is also detachably mounted on the cross member 194 with the screws 210. As will also be noted, this member 208 is formed to provide an annular opening 209 of any desired area when assembled with the main member 206 to permit an adequate intake of air to insure efficient operation of the device should it be necessary to restrict the area of the principal opening 216 in providing proper illumination.

The wires 212 of the motor 176, the wires 213 of the sockets 186 and the wires 214 from the fluorescent lamps 201 and 205, and the auxiliaries 199 and 200, enter the tube 184 as shown, and emerge as the main lead wires 215. These wires, as already described for similar units of Figures 11 and 12, run to and are connected with suitable switches and controls, preferably located away from the assembled unit.

Figure 14 more clearly shows the preferred manner of forming the member 208 to accommodate the two hollow members 197 and 198 without interfering with the quick detachable feature of said member 208. This figure also shows the relative position of the lighting means to the light transmitting air impelling means 172, the main reflector 206 and the co-operating reflector 208. As will be seen, the auxiliaries 199 and 200, necessary to properly operate the fluorescent lamps 201 and 205 on ordinary electrical wiring and currents, are the same as described for Figures 11 and 12. In many instances in practice the lamps 201 and 205, or their equivalent, may be dispensed with, if desired.

Referring to Figures 15 and 16, 220 is an air impeller directly attached to the rotor 221, of the motor 222, by any suitable means such as the screws 223. The light transmitting air impelling blades 224, which are detachably mounted on the impeller arms 225, perform the same functions already described for the air impelling means of Figures 1, 6, 11 and 13. The rotor sleeve 226, which is preferably permanently lubricated, rides on the ball bearings 227 around the vertically disposed hollow member 228. The hollow member 228 is accurately seated on the motor housing 229 and acts to conceal and protect the wires 230 that run to the socket 231, which supports the lamp 232.

The light transmitting member 233, in which the lamp 232 is preferably concealed, may be dispensed with if desired. The annular member 234, which supports the light transmitting member 233, is rigidly attached to the housing 235 that surrounds the bearings 227, and serves to hold bearing lubricant. The adjustable screws 236 act to hold the light transmitting member 233 in rigid assembly on the annular member 234. The motor wires 237 join the lighting wires 230 to emerge from the main supporting tubular member 238 as the lead wires 239. As already explained for Figures 11 and 13, the motor and lighting wires 237 and 230, run to and are connected with suitable switches and controls, preferably located away from the assembled unit. The procedure to be followed in wiring a device of this character is well known to those skilled in the art and a detailed explanation is therefore unnecessary. The reinforcing ribs 240 and 241 perform the same function as already described for similar elements seen in Figures 5, 10 and 12, and may or may not be used as desired.

Figure 16, more clearly shows the relation of the light transmitting air impelling blades 224 to the lamp 232. While I prefer to show only eight air impelling blades, it is to be understood that I am not to be limited to any specific number of blades or form of same, and I may even use air impellers employing a multiplicity of closely spaced blades, or an integral type of impeller.

In view of the increasing use by illuminating engineers of ceilings having efficient reflecting surfaces to obtain good indirect lighting, the light transmitting member 233, which I have preferred to show as a closed globe, may be constructed in many instances to have its inside bottom surface adjacent the lamp 232 of high reflecting qualities with its top section, adjacent the air impelling blades 224, transparent. The member 233 may also be in the form of a cup without a top section and opaque to obtain maximum reflection of the light rays towards the ceiling through the light transmitting air impelling blades 224.

In all embodiments of my invention the lighting means and the air impelling means may be independently controlled in any suitable manner to provide efficient illumination or air flow separately as well as simultaneously, as desired.

In all embodiments of my invention the air impelling means is co-related with the lighting means in such a manner that light rays from the lighting means may pass through the air impeller or impellers of the air impelling means.

While I have shown certain preferred types of air impellers having light transmitting air impelling blades, it is to be understood that any suitable light transmitting air impelling means may be used without departing from the scope of the invention. I therefore desire to have the term air impeller broadly construed as covering any revolvable element which will cause or create a flow of air.

It is also to be understood that while I have preferred to show certain types of lighting means, any suitable type may be used that will provide satisfactory illumination.

In so far as I am aware, I am the first in the art to use an air impeller having light transmitting air impelling blades in the path of light rays issuing from lighting means, whereby light rays will pass through the air impelling blades, and I, therefore, desire to have my claims to these features receive the broad and generic interpretation to which a pioneer in the art is entitled.

Having thus described my invention what I claim as new and desire to secure by Letters Patent is:

1. In a lighting and air impelling device, an electric light, an electric motor, supporting means for said light and motor, and an air impeller driven by said motor and having light transmitting air impelling blades adjacent to said electric light and in the path of light rays issuing from said electric light to thereby provide for illumination at all times through the air impelling blades and to prevent flicker during rotation of said air impeller.

2. In a lighting and air impelling device, an electric light, an electric motor, supporting means for said light and motor, an air impeller driven by said motor and having light transmitting air impelling blades adjacent to said electric light and in the path of light rays issuing from said electric light to thereby provide for illumination at all times through the air impelling blades and to prevent flicker during rotation of said air impeller, and a light transmitting member between said electric light and air impeller.

3. In a lighting and air impelling device, an electric light, an electric motor, supporting means for said light and motor, an air impeller driven by said motor and having light transmitting air impelling blades adjacent to said electric light and in the path of light rays issuing from said electric light to thereby provide for illumination at all times through the air impelling blades and to prevent flicker during rotation of said air impeller, and a light transmitting member between said electric light and air impeller and having openings to permit air to pass around said light.

4. In a lighting and air impelling device, an electric light, an electric motor, supporting means for said light and motor, an air impeller driven by said motor and having light transmitting air impelling blades adjacent to said electric light and in the path of light rays issuing from said electric light to thereby provide for illumination at all times through the air impelling blades and to prevent flicker during rotation of said air impeller, and a light transmitting open ended member between said electric light and air impeller.

5. In a lighting and air impelling device, an electric light, an electric motor, supporting means for said light and motor, an air impeller driven by said motor and having light transmitting air impelling blades adjacent to said electric light and in the path of light rays issuing from said electric light to thereby provide for illumination at all times through the air impelling blades and to prevent flicker during rotation of said air impeller, and an insulating member between said electric light and air impeller.

6. In a lighting and air impelling device, an electric light, an electric motor, supporting means for said light and motor, an air impeller driven by said motor and having light transmitting air impelling blades adjacent to said electric light and in the path of light rays issuing from said electric light to thereby provide for illumination at all times through the air impelling blades and to prevent flicker during rotation of said air impeller, and a reflector between said electric light and air impeller.

7. In a lighting and air impelling device, an electric light, an electric motor, supporting means for said light and motor, an air impeller driven by said motor and having light transmitting air impelling blades adjacent to said electric light and in the path of light rays issuing from said electric light to thereby provide for illumination at all times, through the air impelling blades and to prevent flicker during rotation of said air impeller, and an open ended member surrounding the air impeller to determine the path of the flow of air.

8. In a lighting and air impelling device, an electric light, an electric motor, supporting means for said light and motor, an air impeller driven by said motor and having light transmitting air impelling blades adjacent to said electric light and in the path of light rays issuing from said electric light to thereby provide for illumination at all times through the air impelling blades and to prevent flicker during rotation of said air impeller, and an open ended member surrounding said electric light and air impeller and determining the path of flow of air.

9. In a lighting and air impelling device, an electric light, an electric motor, supporting means for said light and motor, an air impeller driven by said motor and having light transmitting air impelling blades adjacent to said electric light and in the path of light rays issuing from said electric light to thereby provide for illumination at all times through the air impelling blades and to prevent flicker during rotation of said air impeller, and an open ended member surrounding said electric light and air impeller and having its inner face provided with light reflecting qualities.

10. In a lighting and air impelling device, an electric light, an electric motor, supporting means for said light and motor, an air impeller driven by said motor and having light transmitting air impelling blades adjacent to said electric light and in the path of light rays issuing from said electric light to thereby provide for illumination at all times through the air impelling blades and to prevent flicker during rotation of said air impeller, and an open ended light transmitting reflector-diffuser surrounding said electric light and air impeller.

11. In a lighting and air impelling device, an electric light, an electric motor, supporting means for said light and motor, an air impeller driven by said motor and having light transmitting air impelling blades adjacent to said electric light and in the path of light rays issuing from said electric light to thereby provide for illumination at all times through the air impelling blades and to prevent flicker during rotation of said air impeller, and an open ended segmental member surrounding said electric light and air impeller and so arranged as to provide for passage of air between segments.

12. In a lighting and air impelling device, an electric light, an electric motor, supporting means for said light and motor, an air impeller driven by said motor and having light transmitting air impelling blades adjacent to said electric light and in the path of light rays issuing from said electric light to thereby provide for illumination at all times through the air impelling blades and to prevent flicker during rotation of said air impeller, and spaced elements in proximity to said air impeller to divide the air flow created by said impeller.

13. In a lighting and air impelling device, two types of electric lights, one of which is of the fluorescent type, an electric motor, supporting means for said lights and motor, and an air impeller driven by said motor and having light transmitting air impelling blades adjacent to said electric lights and in the path of light rays issuing from said electric lights to thereby provide for illumination at all times through the air impelling blades and to prevent flicker during rotation of said air impeller.

14. In a lighting and air impelling device, a plurality of electric lights, an electric motor, supporting means for said lights and motor, and an air impeller driven by said motor, said lights being located on opposite sides of said air impeller with said impeller having light transmitting air impelling blades adjacent to said electric lights and in the path of light rays issuing from said electric lights to thereby provide for illumination at all times through the air impelling blades and to prevent flicker during rotation of said air impeller.

15. In a lighting and air impelling device, an electric light, an electric motor, supporting means for said light and motor, an air impeller driven by said motor and having light transmitting air impelling blades adjacent to said electric light and in the path of light rays issuing from said electric light to thereby provide for illumination at all times through the air impelling blades and to prevent flicker during rotation of said air impeller, and a combined air deflecting and light reflecting member mounted in proximity to said electric light and air impeller.

16. In a lighting and air impelling device, an electric light, an electric motor, supporting means for said light and motor, and an air impeller driven by said motor and having light transmitting air impelling plastic blades adjacent to said electric light and in the path of light rays issuing from said electric light to thereby provide for illumination at all times through said blades and to prevent flicker during rotation of said impeller.

17. In a lighting and air impelling device, a fluorescent light, an electric motor, supporting means for said light and motor, and an air impeller driven by said motor and having light transmitting air impelling blades adjacent to said fluorescent light and in the path of light rays issuing from said light to thereby provide for illumination at all times through the air impelling blades and to prevent flicker during rotation of said air impeller.

18. In a lighting and air impelling device, a fluorescent light, an electric motor, supporting means for said light and motor, and an air impeller driven by said motor, said flourescent light being disposed on one side of said air impeller, with said impeller having light transmitting air impelling blades adjacent to said fluorescent light and in the path of light rays issuing from said light to thereby provide for illumination at all times through the air impelling blades and to prevent flicker during rotation of said air impeller.

19. In a lighting and air impelling device, a plurality of electric lights, an electric motor, supporting means for said lights and motor, and an air impeller driven by said motor, said lights being spaced from each other and disposed around said impeller, with said impeller having light transmitting air impelling blades adjacent to said electric lights and in the path of light rays issuing from said electric lights to thereby provide for illumination at all times through the air impelling blades and to prevent flicker during rotation of said air impeller.

20. In a lighting and air impelling device, an electric light, an electric motor, supporting means for said light and motor, an air impeller driven by said motor and having light transmitting air impelling blades adjacent to said electric light and in the path of light rays issuing from said electric light to thereby provide for illumination at all times through the air impelling blades and to prevent flicker during rotation of said air impeller, and a light transmitting member adjacent to said electric light and air impeller and in the path of light rays issuing from said electric light.

WILLIAM A. BROWN.